United States Patent
Vanspeybroeck et al.

(10) Patent No.: US 6,380,304 B1
(45) Date of Patent: Apr. 30, 2002

(54) MASS POLYMERIZED RUBBER-MODIFIED MONOVINYLIDENE AROMATIC COPOLYMER COMPOSITIONS

(75) Inventors: Rony S. Vanspeybroeck, Bellem-Aalter; Gilbert Bouquet, Gent; Dominique Maes, Lochristi, all of (BE); Nicolaas Hermans, Terneuzen (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/464,958

(22) Filed: Dec. 16, 1999

Related U.S. Application Data

(60) Provisional application No. 60/157,188, filed on Sep. 30, 1999.

(51) Int. Cl.[7] .............................................. C08F 279/04
(52) U.S. Cl. .............................. 525/70; 525/71; 525/89; 525/98; 525/99
(58) Field of Search ............................. 525/89, 98, 99, 525/70, 71

(56) References Cited

U.S. PATENT DOCUMENTS

| | | | |
|---|---|---|---|
| 2,694,692 A | * | 11/1954 | Amos et al. |
| 2,727,884 A | | 12/1955 | McDonald et al. |
| 3,243,481 A | * | 3/1966 | Ruffing et al. |
| 3,265,765 A | | 8/1966 | Holden et al. |
| 3,280,084 A | | 10/1966 | Zelinski et al. |
| 3,281,383 A | | 10/1966 | Zelinki et al. |
| 3,658,946 A | * | 4/1972 | Bronstert et al. |
| 3,660,535 A | | 5/1972 | Finch et al. |
| 3,668,162 A | | 6/1972 | Wilt |
| 3,668,263 A | | 6/1972 | Morrison et al. |
| 3,703,491 A | | 11/1972 | Takayama et al. |
| 3,787,510 A | | 1/1974 | Farrar |
| 4,182,818 A | | 1/1980 | Tung et al. |
| 4,183,877 A | | 1/1980 | Ibaragi et al. |
| 4,239,863 A | | 12/1980 | Bredeweg |
| 4,264,749 A | | 4/1981 | Sigwalt et al. |
| 4,299,758 A | * | 11/1981 | Hinnenkamp et al. ...... 570/130 |
| 4,340,690 A | | 7/1982 | Lal et al. |
| 4,340,691 A | | 7/1982 | Lai et al. |
| 4,421,895 A | * | 12/1983 | Echte et al. |
| 4,572,819 A | * | 2/1986 | Priddy et al. |
| 4,585,825 A | | 4/1986 | Wesselmann |
| 4,587,294 A | * | 5/1986 | Matsubara et al. |
| 4,639,494 A | * | 1/1987 | Ima et al. |
| 4,666,987 A | * | 5/1987 | Burmester et al. |
| 5,191,023 A | * | 3/1993 | Iwamoto et al. |
| 5,223,577 A | | 6/1993 | Baumgartner et al. |
| 5,756,579 A | * | 5/1998 | Fornasari et al. |

FOREIGN PATENT DOCUMENTS

| | | | |
|---|---|---|---|
| EP | 0 277687 B1 | * | 8/1988 |
| EP | 160974 | * | 1/1990 |
| EP | 355665 | | 2/1990 |
| EP | 0 400 479 A2 | * | 12/1990 |
| EP | 0714942 | * | 6/1996 |
| GB | 1130485 | | 10/1968 |
| JP | 59-179611 | | 10/1984 |
| JP | 59-232140 | * | 12/1984 |
| JP | 5-194676 | | 8/1993 |
| JP | 5-247149 | * | 9/1993 |
| JP | 6-65330 | * | 3/1994 |
| JP | 6-166729 | * | 6/1994 |

* cited by examiner

Primary Examiner—Jeffrey Mullis

(57) ABSTRACT

Disclosed is a mass polymerized rubber-modified monovinylidene aromatic copolymer composition with an excellent balance of physical and mechanical properties and high intrinsic gloss, and methods for preparing such a composition.

19 Claims, No Drawings

US 6,380,304 B1

MASS POLYMERIZED RUBBER-MODIFIED MONOVINYLIDENE AROMATIC COPOLYMER COMPOSITIONS

CROSS REFERENCE STATEMENT

This application claims the benefit of U.S. Provisional Application No. 60/157,188, filed Sep. 30, 1999.

FIELD OF THE INVENTION

This invention relates to mass polymerized rubber-modified monovinylidene aromatic copolymer compositions with an excellent balance of physical and mechanical properties and high intrinsic gloss, and methods for preparing such compositions.

BACKGROUND OF THE INVENTION

Monovinylidene aromatic copolymers reinforced with rubber, in particular with diene rubber, represent a well known class of commercially available engineering polymers widely described in the literature. Specific examples of the copolymers are for example styrene and acrylonitrile copolymers, generally referred to as SAN resins, containing rubber particles, for example butadiene, dispersed in the polymeric matrix, generally known as ABS resins.

The rubber-modified monovinylidene aromatic copolymers can be prepared by continuous or batch processes and by various polymerization processes such as bulk, mass-solution, or mass-suspension, these are generally known as mass polymerization processes. A continuous mass polymerization process is known and described for example in U.S. Pat. Nos. 2,694,692; 3,243,481 and 3,658,946, and in published EP 400,479. This process consists of dissolving the rubbery material in the monovinylidene aromatic monomer and ethylenically unsaturated nitrile monomer mixture, adding possibly a radical polymerization initiator and an inert diluent, and then polymerizing the resulting solution. Immediately after the polymerization reaction commences, the rubbery material in the monomer mixture separates into two phases, of which the former, consisting of a solution of the rubber in the monomer mixture, initially forms the continuous phase, whereas the latter, consisting of a solution of the resultant copolymer in the monomer mixture, remains dispersed in form of droplets in said continuous phase. As polymerization and hence conversion proceed the quantity of the latter phase increases at the expense of the former. As soon as the volume of the latter phase equals that of the former, a phase change occurs, generally known as phase inversion.

When this phase inversion takes place, droplets of rubber solution form in the polymer solution. These rubber solution droplets incorporate by themselves small droplets of what has now become the continuous polymer phase. During the process, grafting of the polymer chains on the rubber takes place, too.

Generally, the polymerization is carried out in several stages. In the first polymerization stage, known as prepolymerization, the solution of the rubber in the monomer mixture is polymerized until phase inversion is reached. Polymerization is then continued up to the desired conversion.

Mass polymerization affords rubber-modified monovinylidene aromatic copolymers with a good balance of physical and mechanical properties, however the surface gloss of such copolymers is not always quite satisfactory. It is well know that surface gloss of a fabricated product is a function of copolymer composition as well as how the article is fabricated, e.g., the conditions under which the copolymer is molded or extruded. Less than favorable fabricating conditions result in lower surface gloss sometimes referred to as the intrinsic gloss of the copolymer.

The intrinsic gloss of diene rubber-modified monovinylidene copolymers can be improved by reducing the size of the rubber particles to less than 1 micrometer, e.g., by vigorous stirring during polymerization. However, this approach has not been successful because the usually available linear polybutadiene rubbers have a rather high molecular weight and thus a high solution viscosity, so that even with a strong agitation, it is not possible to achieve satisfactory rubber sizing, at least for the rubber concentrations commonly used in these copolymers (5 to 15 percent). Linear polybutadiene rubbers of low molecular weight and hence of reduced solution viscosity could be easily sized under stirring, but these rubber suffer from the known cold flow draw back, which introduced additional problems in their storage and handling.

U.S. Pat. No. 4,421,895 discloses the use of a diene rubber with a solution viscosity of 80 centipoise (cps) or less, when measured as a 5 weight percent solution in styrene at 25° C., in ABS production. Specifically, the diene rubber proposed in this patent is a styrene and butadiene linear block copolymer. This type of block rubber does not suffer from cold flow and easily affords the formation of small particles. Using this type of linear block rubber and operating in accordance with the process described in this patent, an ABS with rubber particles of less than 0.7 micrometers ($\mu$m) is obtained. However, by using the above styrene and butadiene linear block copolymer, the intrinsic gloss improvement is achieved at the expense of the other physical properties and mechanical properties, in particular the impact strength, so that the ABS obtained does not offer the desired combination of good physical and mechanical properties and intrinsic gloss.

Further, rubber-modified monovinylidene aromatic copolymers prepared from rubber mixtures of linear butadiene and linear block copolymer rubbers are disclosed for example in U.S. Pat. No. 5,756,579. However, while mechanical properties are improved these ABS compositions do not achieve the desired intrinsic gloss.

It is also known from the literature that rubber-modified monovinylidene aromatic copolymers can be prepared by using as the rubber a star-branched or radial block polymer. The use of such star-branched rubbers in rubber-modified monovinylidene aromatic copolymer production is discussed for example in U.S. Pat. Nos. 5,191,023; 4,587,294 and 4,639,494, in published EP 277,687 and in JP 59-232, 140 and 59-179,611. However, while compared with other known diene rubbers, these star-branched rubbers afford copolymers with an improved balance of gloss and physical and mechanical properties they still have the drawback of lower intrinsic gloss.

Attempts to provide rubber-modified monovinylidene aromatic copolymers with an improved balance of gloss and physical and mechanical properties prepared from mixtures of star-branched and linear rubbers are disclosed for example in published JP 5-194,676; 5-247,149; 6-166,729 and 6-65,330 and in published EP 160,974. However, these compositions have large rubber particle sizes resulting in lower intrinsic gloss than desired.

In view of the deficiencies of the rubber-modified monovinylidene aromatic copolymer compositions thus obtained by utilizing any of such methods it would be highly desirable to provide an economical rubber-modified monovinylidene aromatic copolymer composition which exhibits an improved balance of physical and mechanical properties combined with high intrinsic gloss.

SUMMARY OF THE INVENTION

Accordingly, the present invention is such a desirable economical rubber-modified monovinylidene aromatic copolymer composition having a desirable balance of high intrinsic gloss and good impact resistance. The composition comprises a continuous matrix phase, comprising a monovinylidene aromatic monomer and an ethylenically unsaturated nitrile monomer, with a rubber dispersed therein as discrete rubber particles, said composition having an intrinsic gloss of at least 70 percent and an Izod impact strength of at least 150 Joule per meter (J/m). The rubber-modified copolymer is prepared using bulk, mass-solution or mass-suspension polymerization techniques.

In another aspect, the present invention is a process for preparing a mass polymerized rubber-modified monovinylidene aromatic copolymer composition comprising the steps of mass polymerizing in the presence of a dissolved rubber a monovinylidene aromatic monomer and an ethylenically unsaturated nitrile monomer, optionally in the presence of an inert solvent, to the desired degree of conversion and subjecting the resultant mixture to conditions sufficient to remove any unreacted monomers and to cross-link the rubber, said composition having an intrinsic gloss of at least 70 percent and an Izod impact strength of at least 150 J/m.

In a further aspect, the present invention involves a method of molding or extruding a mass polymerized rubber-modified monovinylidene aromatic copolymer composition comprising a continuous matrix phase, comprising a monovinylidene aromatic monomer and an ethylenically unsaturated nitrile monomer, with a rubber dispersed therein as discrete rubber particles, said composition having an intrinsic gloss of at least 70 percent and an Izod impact strength of at least 150 J/m.

In yet a further aspect, the invention involves molded or extruded articles of a mass polymerized rubber-modified monovinylidene aromatic copolymer composition comprising a continuous matrix phase, comprising a monovinylidene aromatic monomer and an ethylenically unsaturated nitrile monomer, with a rubber dispersed as discrete rubber particles, said composition having an intrinsic gloss of at least 70 percent and an Izod impact strength of at least 150 J/m.

The mass polymerized rubber-modified monovinylidene aromatic copolymer compositions of the present invention are especially useful in the preparation of molded objects notably parts prepared by injection molding techniques where a balance of high surface gloss and good impact resistance is desired. Such properties are particularly appropriate for household appliances, toys, automotive parts, extruded pipe, profiles and sheet for sanitary applications, power tool housings, telephone housings, computer housings, copier housings, etc.

DETAILED DESCRIPTION OF THE INVENTION

Suitable rubber-modified monovinylidene aromatic copolymers employed in the present invention comprise a monovinylidene aromatic and ethylenically unsaturated nitrile copolymer in a matrix or continuous phase and rubber particles dispersed in the matrix. The matrix or continuous phase of the present invention is a copolymer comprising polymerized therein a monovinylidene aromatic monomer and an ethylenically unsaturated nitrile monomer or a copolymer comprising polymerized therein a monovinylidene aromatic monomer, an ethylenically unsaturated nitrile monomer and one or more vinyl monomer that can be copolymerized with them. Copolymer, as used herein, is defined as a polymer having two or more monomers interpolymerized. These compositions are generically known as SAN-type or SAN since poly (styrene-acrylonitrile) is the most common example.

The weight average molecular weight ($M_w$) of the matrix copolymer is typically equal to or greater than about 50,000, preferably equal to or greater than about 80,000, and more preferably equal to or greater than about 100,000. The weight average $M_w$ of the matrix copolymer is typically equal to or less than about 300,000, preferably equal to or less than about to 240,000 and most preferably equal to or less than about 180,000. Molecular weight, unless otherwise specified is weight average molecular weight, is measured by gel permeation chromatography (GPC).

Monovinylidene aromatic monomers include but are not limited to those described in U.S. Pat. Nos. 4,666,987; 4,572,819 and 4,585,825, which are herein incorporated by reference. Preferably, the monomer is of the formula:

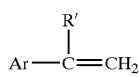

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Preferred monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from an amount equal to or greater than about 50 weight percent, preferably from an amount equal to or greater than about 60 weight percent, more preferably from an amount equal to or greater than about 65 weight percent, and most preferably from an amount equal to or greater than about 70 weight percent based on the total weight of the matrix copolymer. Typically, such monovinylidene aromatic monomer will constitute less than or equal to about 95 weight percent, preferably less than or equal to about 85 weight percent, more preferably less than or equal to about 80 weight percent, and most preferably less than or equal to about 75 weight percent based on the total weight of the matrix copolymer.

Unsaturated nitriles include, but are not limited to, acrylonitrile, methacrylonitrile, ethacrylonitrile, fumaronitrile and mixtures thereof. The unsaturated nitrile is generally employed in the matrix copolymer in an amount equal to or greater than about 5 weight percent, preferably in an amount equal to or greater than about 10 weight percent, more preferably in an amount equal to or greater than about 15 weight percent, and most preferably in an amount equal to or greater than about 20 weight percent based on the total weight of the matrix copolymer. The unsaturated nitrile is generally employed in the matrix copolymer in an amount less than or equal to about 50 weight percent, preferably equal to or less than about 45 weight percent, more preferably less than or equal to about 35 weight percent, and most preferably less than or equal to about 25 weight percent based on the total weight of the matrix copolymer.

Other vinyl monomers may also be included in polymerized form in the matrix copolymer, including conjugated 1,3 dienes (e.g. butadiene, isoprene, etc.); alpha—or beta-unsaturated monobasic acids and derivatives thereof (e.g., acrylic acid, methacrylic acid, etc., and the corresponding esters thereof such as methylacrylate, ethylacrylate, butyl acrylate, methyl methacrylate, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide, etc.; and the like. These additional comonomers can be incorporated in to the composition in several ways including, interpolymerization with the monovinylidene aromatic and ethylenically unsaturated nitrile matrix copolymer and/or polymerization into polymeric components which can be combined, e.g. blended in to the matrix. If present, the amount of such comonomers will generally be equal to or less than about 20 weight percent, more preferably equal to or less than about 10 weight percent and most preferably less than or equal to about 5 weight percent based on the total weight of the matrix copolymer.

The matrix copolymer is present in an amount equal to or greater than about 40 weight percent, preferably equal to or greater than about 50 weight percent, more preferably equal to or greater than about 60 weight percent, even more preferably equal to or greater than about 70 weight percent, and most preferably equal to or greater than about 75 weight percent based on the weight of the rubber-modified monovinylidene aromatic copolymer. The matrix copolymer is present in an amount equal to or less than about 95 weight percent, preferably equal to or less than about 90 weight percent, more preferably equal to or less than about 85 weight percent, even more preferably equal to or less than about 80 weight percent, and most preferably equal to or less than about 75 weight percent based on the weight of the rubber-modified monovinylidene aromatic copolymer.

The various techniques suitable for producing rubber-modified monovinylidene aromatic copolymer are well known in the art. Examples of these known polymerization processes include bulk, mass-solution, or mass-suspension polymerization, generally known as mass polymerization processes. See, for example, U.S. Pat. Nos. 3,660,535; 3,243,481 and 4,239,863, which are incorporated herein by reference.

In general, continuous mass polymerization techniques are advantageously employed in preparing the rubber-modified monovinylidene aromatic copolymer of the present invention. Preferably, the polymerization is conducted in one or more substantially linear, stratified flow or so-called "plug-flow" type reactor such as described in U.S. Pat. No. 2,727,884, which may or may not comprise recirculation of a portion of the partially polymerized product or, alternatively, in a stirred tank reactor wherein the contents of the reactor are essentially uniform throughout, which stirred tank reactor is generally employed in combination with one or more "plug-flow" type reactors. The temperatures at which polymerization is most advantageously conducted are dependent on a variety of factors including the specific initiator and type and concentration of rubber, comonomers and reaction diluent, if any, employed. In general, polymerization temperatures from 60 to 160° C. are employed prior to phase inversion with temperatures from 100 to 190° C. being employed subsequent to phase inversion. Mass polymerization at such elevated temperatures is continued until the desired conversion of monomers to polymer is obtained. Generally, conversion of from 65 to 90, preferably 70 to 85, weight percent of the monomers added to the polymerization system (i.e., monomer added in the feed and any additional stream, including any recycle stream) to polymer is desired.

Following conversion of a desired amount of monomer to polymer, the polymerization mixture is then subjected to conditions sufficient to cross-link the rubber and remove any unreacted monomer. Such cross-linking and removal of unreacted monomer, as well as reaction of diluent, if employed, and other volatile materials is advantageously conducted employing conventional devolatilization techniques, such as introducing the polymerization mixture into a devolatilizing chamber, flashing off the monomer and other volatiles at elevated temperatures, e.g., from 200 to 300 C., under vacuum and removing them from the chamber.

Alternatively, a combination of mass and suspension polymerization techniques are employed. Using said techniques, following phase inversion and subsequent size stabilization of the rubber particles, the partially polymerized product can be suspended with or without additional monomers in an aqueous medium which contains a polymerized initiator and polymerization subsequently completed. The rubber-modified monovinylidene aromatic copolymer is subsequently separated from the aqueous medium by acidification, centrifugation or filtration. The recovered product is then washed with water and dried.

Various rubbers are suitable for use in the present invention. The rubbers include diene rubbers, ethylene propylene rubbers, ethylene propylene diene (EPDM) rubbers, acrylate rubbers, polyisoprene rubbers, halogen containing rubbers, and mixtures thereof.

Also suitable are interpolymers of rubber-forming monomers with other copolymerizable monomers.

Preferred rubbers are diene rubbers such as polybutadiene, polyisoprene, polypiperylene, polychloroprene, and the like or mixtures of diene rubbers, i.e., any rubbery polymers of one or more conjugated 1, 3-dienes, with 1, 3-butadiene being especially preferred. Such rubbers include homopolymers and copolymers of 1, 3-butadiene with one or more copolymerizable monomers, such as monovinylidene aromatic monomers as described hereinabove, styrene being preferred. Preferred copolymers of 1, 3-butadiene are block or tapered block rubbers of at least about 30 weight percent 1, 3-butadiene rubber, more preferably from about 50 weight percent, even more preferably from about 70 weight percent, and most preferably from about 90 weight percent 1, 3-butadiene rubber and up to about 70 weight percent monovinylidene aromatic monomer, more preferably up to about 50 weight percent, even more preferably up to about 30 weight percent, and most preferably up to about 10 weight percent monovinylidene aromatic monomer, weights based on the weight of the 1, 3-butadiene copolymer.

Linear block copolymers can be represented by one of the following general formulas:

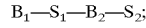

In which S, $S_1$, and $S_2$ are non-elastic polymer blocks of a monovinylidene aromatic monomer, with equal or different molecular weights and B, $B_1$, and $B_2$ are elastomeric polymer blocks based on a conjugated diene, with equal or different molecular weights. In these linear block copolymers, the non-elastic polymer blocks have a molecular weight of between 5,000 and 250,000 and the elastomeric polymer blocks have a molecular weight of between 2,000 and 250,000. Tapered portions can be present among the polymer blocks, S, $S_1$, and $S_2$ and B, $B_1$, and $B_2$. In the tapered portion the passage between the blocks B, $B_1$, and $B_2$ and S, $S_1$, and $S_2$ can be gradual in the sense that the proportion of monovinylidene aromatic monomer in the diene polymer increases progressively in the direction of the non-elastomeric polymer block, whereas the portion of conjugated diene progressively decreases. The molecular weight of the tapered portions is preferably between 500 and 30,000. These linear block copolymers are described for example in U.S. Pat. No. 3,265,765 and can be prepared by methods well known in the art. Further details on the physical and structural characteristics of these copolymers are given in B. C. Allport et al. "Block Copolymers", Applied Science Publishers Ltd., 1973.

The rubbers preferably employed in the practice of the present invention are those polymers and copolymers which exhibit a second order transition temperature, sometimes referred to as the glass transition temperature ($T_g$), for the diene fragment which is not higher than 0° C. and preferably not higher than −20° C. as determined using conventional techniques, e.g. ASTM Test Method D 746–52 T. $T_g$ is the temperature or temperature range at which a polymeric material shows an abrupt change in its physical properties, including, for example, mechanical strength. $T_g$ can be determined by differential scanning calorimetry (DSC).

The rubber in the rubber-modified monovinylidene aromatic copolymer of the present invention is present in an amount equal to or greater than about 5 weight percent, preferably equal to or greater than about 10 weight percent, more preferably equal to or greater than about 15 weight percent, even more preferably equal to or greater than about 20 weight percent, and most preferably equal to or greater than about 25 weight percent based on the weight of the rubber-modified monovinylidene aromatic copolymer. The rubber in the rubber-modified monovinylidene aromatic copolymer of the present invention is present in an amount equal to or less than about 60 weight percent, preferably equal to or less than about 50 weight percent, more preferably equal to or less than about 40 weight percent, even more preferably equal to or less than about 30 weight percent, and most preferably equal to or less than about 25 weight percent based on the weight of the rubber-modified monovinylidene aromatic copolymer.

Preferred structures for the rubber dispersed in the matrix copolymer are one or more branched rubber, one or more linear rubber or combinations thereof. Branched rubbers, as well as methods for their preparation, are known in the art. Representative branched rubbers and methods for their preparation are described in Great Britain Patent No. 1,130,485 and in *Macromolecules*, Vol. II, No. 5, pg. 8, by R. N. Young and C. J. Fetters.

A preferred branch rubber is a radial or star-branched polymer, commonly referred to as polymers having designed branching. Star-branched rubbers are conventionally prepared using a polyfunctional coupling agent or a polyfunctional initiator and have three or more polymer segments sometimes referred to as arms, preferably between three to eight arms, bonded to a single polyfunctional element or compound, represented by the formula (rubber polymer segment$)_k$Q wherein preferably, k is an integer from 3 to 8, and Q is a moiety of a polyfunctional coupling agent. Organometalic anionic compounds are preferred polyfunctional initiators, particularly lithium compounds with $C_{1-6}$ alkyl, $C_6$ aryl, or $C_{7-20}$ alkylaryl groups. Tin-based and polyfunctional organic coupling agents are preferably employed; silicon-based polyfunctional coupling agents are most preferably employed.

The arms of the star-branched rubber are preferably one or more 1,3-butadiene rubber, more preferably they are all the same type of 1,3-butadiene rubber, i.e., 1,3-butadiene tapered block copolymer(s), 1,3-butadiene block copolymer(s) or 1,3-butadiene homopolymer(s) or a combination thereof. A star-branched rubber with such a structure may be represented by the formula $$X_m Y_n Z_o Q \tag{1}$$

wherein X is one or more 1,3-butadiene tapered block copolymer, Y is one or more 1,3-butadiene block copolymer and Z is one or more 1,3-butadiene homopolymer, Q is a moiety of a polyfunctional coupling agent and m, n, and o are independently integers from 0 to 8 wherein the sum of m+n+o is equal to the number of groups of the polyfunctional coupling agent and is an integer from at least 3 to 8.

Preferred star-branched rubbers are represented by formula (1) wherein m is equal to zero, e.g., $Y_n Z_o Q$. More preferred are star-branched rubbers represented by formula (1) wherein m is equal to zero and n and o are integers equal to or greater than about 1 and less than or equal to about 3 and the sum of n+o is equal to about 4, for example $Y_2 Z_2 Q$, $Y_1 Z_3 Q$, and $Y_3 Z_1 Q$. Even more preferably, all of the arms of the star-branched rubber are the same type of rubber, i.e., all 1,3-butadiene tapered block copolymers, e.g., $X_m Y_n Z_o Q$ wherein n and o are equal to zero, more preferably all 1,3-butadiene block copolymers e.g., $X_m Y_n Z_o Q$ wherein m and o are equal to zero and most preferably all 1,3-butadiene homopolymers, e.g., $X_m Y_n Z_Q$ wherein m and n are equal to zero.

A more preferred star-rubber has about four arms of 1,3-butadiene represented by the formula $X_m Y_n Z_o Q$ wherein Z is one or more 1,3-butadiene homopolymer, Q is a moiety of a tetrafunctional coupling agent, m and n are equal to zero, and o is equal to about 4. Further, a more preferred star-rubber has about four arms of 1,3-butadiene represented by the formula $X_m Y_n Z_o Q$ wherein Y is a 1,3-butadiene and styrene block copolymer, Z is one or more 1,3-butadiene homopolymer, Q is a moiety of a tetrafunctional coupling agent, m is equal to zero, n is equal to about 1, and o is equal to about 3. Moreover, a most preferred star-rubber has about six arms of 1,3-butadiene represented by the formula $X_m Y_n Z_o Q$ wherein Y is one or more 1,3-butadiene and styrene block copolymer, Z is one or more 1,3-butadiene homopolymer, Q is a moiety of a hexafunctional coupling agent, m is equal to zero, the sum of n and o is equal to about 6.

When m and/or n are not equal to zero, styrene and butadiene are the preferred comonomers comprising the tapered block copolymer and/or block copolymer arms of the star-branched rubber. Tapered block copolymer arms and/or block copolymer arms may be attached to the polyfunctional coupling agent through a styrene block. Alternatively, tapered block copolymer arms and/or block copolymer arms may be attached to the polyfunctional coupling agent through a butadiene block.

Methods for preparing star-branched or radial polymers having designed branching are well known in the art. Methods for preparing a polymer of butadiene using a coupling agent are illustrated in U.S. Pat. Nos. 4,183,877;

4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference. Other star-branched rubbers useful in the composition of the present invention include those taught in U.S. Pat. Nos. 3,280,084 and 3,281,383, which are incorporated herein by reference.

If present, the branched rubber in the rubber-modified monovinylidene aromatic copolymer of the present invention is present in an amount equal to or greater than about 1 weight percent, preferably equal to or greater than about 10 weight percent, more preferably equal to or greater than about 20 weight percent, more preferably equal to or greater than about 30 weight percent, even more preferably equal to or greater than about 40 weight percent and most preferably equal to or greater than about 50 weight percent based on the total weight of the rubber in the rubber-modified monovinylidene aromatic copolymer. The branched rubber of the rubber-modified monovinylidene aromatic copolymer of the present invention is present in an amount equal to or less than about 100 weight percent, preferably equal to or less than about 90 weight percent, more preferably equal to or less than about 80 weight percent, more preferably equal to or less than about 70 weight percent, even more preferably equal to or less than about 60 weight percent, and most preferably equal to or less than about 50 weight percent based on the total weight of the rubber in the rubber-modified monovinylidene aromatic copolymer.

Linear rubbers, as well as methods for their preparation, are well known in the art. The term "linear rubber" refers to straight chains of polymerized monomer or comonomers which include uncoupled and dicoupled rubber wherein one or two polymeric segments or arms have been attached to a multifunctional coupling agent represented by the formula (rubber polymer segment$)_k$Q wherein k is an integer from 1 to 2. The rubber polymer segments in a dicoupled linear rubber having the formula (rubber polymer segment$)_2$Q, can be the same type, i.e., both 1, 3-butadiene homopolymers, more preferably 1, 3-butadiene taper block copolymers, and most preferably 1, 3-butadiene block copolymers, or they can be different, for example, one rubber polymer segment can be a 1, 3-butadiene homopolymer and the other polymer segment a 1, 3-butadiene block copolymer. Preferably, the linear rubber is one or more 1, 3-butadiene homopolymer, more preferably one or more 1, 3-butadiene tapered block copolymer, most preferably one or more 1, 3-butadiene block copolymer or combinations thereof. The preferred comonomers comprising the tapered block copolymer and/or block copolymer linear rubber are styrene and butadiene.

If present, the linear rubber of the rubber-modified monovinylidene aromatic copolymer of the present invention is present in an amount equal to or less than about 100 weight percent, preferably equal to or less than about 90 weight percent, more preferably equal to or less than about 80 weight percent, more preferably equal to or less than about 70 weight percent, even more preferably equal to or less than about 60 weight percent, and most preferably equal to or less than about 50 weight percent based on the total weight of the rubber in the rubber-modified monovinylidene aromatic copolymer. The linear rubber in the rubber-modified monovinylidene aromatic copolymer of the present invention is present in an amount equal to or greater than about 1 weight percent, preferably equal to or greater than about 10 weight percent, more preferably equal to or greater than about 20 weight percent, more preferably equal to or greater than about 30 weight percent, even more preferably equal to or greater than about 40 weight percent and most preferably equal to or greater than about 50 weight percent based on the total weight of the rubber in the rubber-modified monovinylidene aromatic copolymer.

Advantageously the cis content of the branched and linear rubbers will be independently equal to or less than 75 percent, preferably equal to or less than 55 percent, and most preferably equal to or less than 50 percent as determined by conventional IR.

Preferably, branched rubbers according to the present invention have relatively high average molecular weights and have relatively low solution viscosities (less than 60 cps, 5 weight percent solution in styrene at 25° C.) and high Mooney viscosities (greater than 35). Mooney viscosity is determined under standard conditions in accordance with ASTM D 1646 and is reported as X-ML$_{1+4}$ at 100° C. where X is the measured number, M is the Mooney unit, L designates the roter size (large), 1 is the time in minutes the specimen is allowed to heat in the viscometer, 4 is the time in minutes at which reading X was taken and 100° C. is the test temperature.

Preferably, the molecular weight of the branched rubber, as determined by GPC using laser scattering techniques, is equal to or greater than about 60,000, more preferably equal to or greater than about 90,000, and most preferably equal to or greater than about 120,000. The molecular weight of the branched rubber is preferably less than or equal to about 300,000, more preferably less than or equal to about 240,000, and most preferably less than or equal to 180,000.

Preferably, the molecular weight of the linear rubber, as determined by GPC with a refractive index detector and polystyrene standards, is equal to or greater than about 150,000, more preferably equal to or greater than about 180,000, and most preferably equal to or greater than about 200,000. The molecular weight of the linear rubber is preferably less than or equal to about 400,000, more preferably less than or equal to about 300,000, and most preferably less than or equal to 250,000.

Generally, the solution viscosity of the branched and linear rubbers are independently at least about 5 cps, preferably at least about 10 cps, preferably at least about 15 cps, and most preferably at least about 20 cps. Preferably, the branched and linear rubbers independently have a solution viscosity of less than or equal to about 200 cps, preferably less than or equal to about 100 cps, preferably less than or equal to about 50 cps, and most preferably less than or equal to about 40 cps.

Generally, the ML$_{1+4}$ at 100° C. Mooney viscosities of the branched and linear rubbers are independently at least about 15, preferably at least about 25, preferably at least about 35, and most preferably at least about 45. Preferably, the branched and linear rubbers independently have a Mooney viscosity of less than or equal to about 100, preferably less than or equal to about 85, preferably less than or equal to about 75, and most preferably less than or equal to about 60.

The rubber, with graft and/or occluded polymers if present, is dispersed in the continuous matrix phase as discrete particles. Preferably, the rubber particles comprise a range of sizes having a mono-modal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. The average particle size of the rubber particles is equal to or greater than about 0.01 micrometer (μm), preferably equal to or greater than about 0.15 μm, more preferably equal to or greater than about 0.25 μm, and most preferably equal to or greater than about 0.30 μm. The average particle size of the rubber particles is equal to or less than about 5 μm, preferably equal to or less than about 2.5 μm, more preferably equal to or less than about 1 μm, even more preferably equal to or less than about 0.6 μm, and most preferably equal to or less than about 0.4 μm. The volume average diameter can be determined by the analysis of transmission electron micrographs of the compositions containing the particles, as described in the examples hereinbelow.

Rubber cross-linking is quantified by the light absorbance ratio (LAR). In the rubber-modified copolymer of the present invention, it is preferred that the rubber particles have a light absorbance ratio preferably equal to or greater than about 1, more preferably equal to or greater than about 1.1, even more preferably equal to greater than about 1.4, and most preferably equal to or greater than about 1.7. The preferred light absorbance ratio of the dispersed phase is less than or equal to about 5, preferably less than or equal to about 4, more preferably less than or equal to about 3, even more preferably less than or equal to about 2, and most preferably less than or equal to 1.8. Light absorbance ratio is the ratio of light absorbance for a suspension of the rubber particles in dimethylformamide to the light absorbance for a suspension of the rubber particles in dichloromethane, as described in the examples hereinbelow.

The light absorbance ratio, which is a measure for degree of crosslinking, is dependent on the amount and kind of the polymerization initiator and the temperature and the residence time at the removal step for the volatile components. It also depends on the types and amounts of the matrix monomers, antioxidant, chain transfer agent, ect. A suitable light absorbance ratio can be set by a person skilled in the art by choosing the appropriate conditions for the production process in accordance with the trial and error method.

The rubber-modified monovinylidene aromatic copolymer composition of the present invention preferably has a melt flow rate (MFR), determined under conditions of 220° C. and an applied load of 10 kg, equal to or greater than about 0.1, more preferably equal to or greater than about 1, more preferably equal to or greater than about 5, and most preferably equal to or greater than about 10 g/10 min. Generally, the melt flow rate of the rubber-modified copolymer is equal to or less than about 100, preferably equal to or less than about 50, more preferably less than or equal to about 20, and most preferably equal to or less than about 10 g/10 min.

The rubber-modified monovinylidene aromatic copolymer composition of the present invention can be employed in mixtures, alloys or blends with other polymer and/or copolymer resins, for example, mixtures with nylons, polysulfones, polyethers, polyether imides, polyphenylene oxides, polycarbonates or polyesters. In addition, the claimed rubber-modified monovinylidene aromatic copolymer composition may also optionally contain one or more additives that are commonly used in compositions of this type. Preferred additives of this type include, but are not limited to: fillers, reinforcements, ignition resistant additives, stabilizers, colorants, antioxidants, antistats, impact modifiers, silicon oils, flow enhancers, mold releases, nucleating agents, etc. Preferred examples of additives are fillers, such as, but not limited to talc, clay, wollastonite, mica, glass or a mixture thereof. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize mass polymerized rubber-modified monovinylidene aromatic copolymer compositions against degradation caused by, but not limited to heat, light, and oxygen, or a mixture thereof may be used.

If used, such additives may be present in an amount from at least about 0.01 percent by weight, preferably at least about 0.1 percent by weight, more preferably at least about 1 percent by weight, more preferably at least about 2 percent by weight, and most preferably at least about 5 percent by weight based on the weight of the rubber-modified monovinylidene aromatic copolymer composition. Generally, the additive is present in an amount less than or equal to about 25 percent by weight, preferably less than or equal to about 20 percent by weight, more preferably less than or equal to about 15 percent by weight, more preferably less than or equal to about 12 percent by weight, and most preferably less than or equal to about 10 percent by weight based on the weight of the rubber-modified monovinylidene aromatic copolymer composition.

Preferably, a low molecular weight additive having a surface tension of less than 30 dynes/cm (ASTM D1331, 25° C.) is included in the rubber-modified monovinylidene aromatic copolymer. In particular, a low molecular weight silicone oil is used to improve impact properties as described in U.S. Pat. No. 3,703,491, which is herein incorporated by reference. Preferably, the silicone oil is polydimethylsiloxane having a viscosity of from 5 to 1000 cps, preferably from 25 to 500 cps. The composition typically contains the low molecular weight silicone oil from 0.01 to 5.0 weight percent, based on the total weight of the rubber-modified monovinylidene aromatic copolymer, preferably from 0.1 to 2.0 weight percent. The effect of such silicone oil is enhanced by the incorporation of other additives such as wax and tallow, wherein each is also incorporated at a level of from 0.5 to 1.5 weight percent, based on the total weight of the rubber-modified monovinylidene aromatic copolymer. Alternatively, fluorinated compounds such as a perfluoropolyether or a tetrafluoroethylene polymer can be used as the low molecular weight additive. Mixtures of such additives can also be used.

The rubber-modified monovinylidene aromatic copolymer composition of this invention is thermoplastic. When softened or melted by the application of heat, the compositions of this invention can be formed or molded using conventional techniques such as compression molding, injection molding, gas assisted injection molding, calendering, vacuum forming, thermoforming, extrusion and/or blow molding, alone or in combination.

The rubber-modified monovinylidene aromatic copolymer composition of this invention is ideal for formed or molded articles requiring high surface gloss. It is well known to one skilled in the art that surface gloss is very dependent upon molding conditions, i.e., for injection molding, machine parameters such as barrel and mold temperatures, injection and holding speed/pressure/times, etc., and method of testing gloss can dramatically effect the gloss value for a given material. The gloss value for materials molded under unfavorable conditions is referred to as intrinsic gloss. Unfavorable conditions generally are those which limit or reduce the flow of the material during molding. For example, it is well known that surface gloss is reduced when during injection molding lower melt temperature, lower mold temperature, lower injection pressure, slower injection speed, lower holding pressure, etc., are applied. Conversely, conditions which enhance the flow of the material will improve gloss. Materials with an intrinsic gloss less than 70 percent can, when molded under favorable or ideal conditions, demonstrate higher gloss (e.g., 70 percent or higher).

The mass polymerized rubber-modified monovinylidene aromatic copolymer compositions can also be formed, spun, or drawn into films, fibers, multi-layer laminates or extruded sheets, or can be compounded with one or more organic or inorganic substances, on any machine suitable for such purpose. Some of the fabricated articles include household appliances, toys, automotive parts, extruded pipe, profiles and sheet for sanitary applications. These compositions can even find use in instrument housings such as for power tools or information technology equipment such as telephones, computers, copiers, etc.

EXAMPLES

To illustrate the practice of this invention, examples of preferred embodiments are set forth below. However, these examples do not in any manner restrict the scope of this invention.

The compositions of Examples 1 to 9 and comparative examples A to E are mass produced acrylonitrile butadiene styrene terpolymer resins wherein the rubber was dissolved in a feed stream of styrene, acrylonitrile, and ethyl benzene to form a mixture. The mixture was polymerized in a continuous process while agitating said mixture. The polymerization occurred in a multi staged reactor system over an increasing temperature profile. During the polymerization process, some of the forming copolymer grafts to the rubber particles while some of it does not graft, but instead, forms the matrix copolymer. The resulting polymerization product was then devolotalized, extruded, and pelletized.

The pellets were used to prepare test specimens on a DEMAG injection molding machine model D 150–452 having the following molding conditions: Barrel temperature settings of 220, 230, and 240° C.; Nozzle temperature of 250° C., Hot runner tip temperature of 245° C., Mold temperature of 50° C.; Injection pressure: 70 bar; Holding pressures 1/2/3: 60/50/35 bar; Back pressure: 5 bar; Injection time: 10 seconds; Follow-up pressure 1/2/3: 5/4/2 seconds; Cooling time: 20 seconds; and injection speed: 18 cubic centimeters per second ($cm^3/s$).

The formulation content and properties of Examples 1 to 9 and comparative examples A to E are given in table 1 below in percent based on weight of the total rubber-modified monovinylidene aromatic composition. In Table 1:

"Linear rubber-1" is a 70/30 butadiene/styrene block copolymer commercially available as SOLPRENE™ 1322 from Industries Negromex having a 5 percent solution viscosity in styrene of 25 cps;

"Linear rubber-2" is a 15/85 styrene and butadiene block copolymer commercially available as SOLPRENE™ 1110 from Industries Negromex having a 5 percent solution viscosity in styrene of 35 cps;

"Star-branched rubber-1" is a butadiene homopolymer commercially available as BUNA™ HX565 from Bayer having a 5 percent solution viscosity in styrene of 44 cps, a Mooney viscosity of 59, a $M_w$ of 200,000, and a Mn of 110,000;

"Star-branched rubber-2" is an anionically polymerized 95/5 butadiene/styrene block copolymer coupled with a tetrafuctional coupling agent having a 5 percent solution viscosity in styrene of 20 cps;

"PBD" is the percent polybutadiene in the rubber;

"SAN" is the styrene and acrylonitrile matrix copolymer;

"$M_w$" is the matrix copolymer (e.g., SAN) weight average molecular weight which was measured by gel permeation chromatography using polystyrene standards, determinations were made with a UV detector set at 254 nanometers;

"$M_n$" is the matrix copolymer (e.g., SAN) number average molecular weight which was measured by gel permeation chromatography using polystyrene standards, determinations were made with a UV detector set at 254 nanometers;

"% AN" is the percent acrylonitrile in the SAN;

"PDMS" is a polydimethylsiloxane available as DC 200 (50 centistokes) from Dow Corning;

"RPS" is the rubber particle size reported as volume average particle diameter (Dv) determined by the analysis of transmission electron micrographs.

Samples prepared from melt flow rate strands produced by means of an extrusion plastometer at 220° C. and 3.8 kg load were cut to fit a microtome chuck. The area for microtomy was trimmed to approximately 1 square millimeter ($mm^2$) and stained in $OsO_4$ vapor overnight at 24° C. Ultrathin sections were prepared using standard microtomy techniques. 70 nanometer thin sections were collected on Cu grids and were studied in a Philips CM12 Transmission Electron microscope at 120 KV. The resulting micrographs were analyzed for rubber particle size distribution and rubber phase volume by means of a Leica Quantimet Q600 image analyzer. Images were scanned with a resolution of 0.005 micometer/pixel in auto contrast mode in which the white level was adjusted first to give full-scale output on the whitest part of the image then black level was adjusted to give zero output on the darkest part of the image. Unwanted artifacts in the background were removed by a smooth white morphological transform.

Micrographs show particles which are not cut through the middle. A correction method developed by Scheil (E. Scheil, Z. Anorg. Allgem. Chem. 201, 259 (1931); E. Scheil, Z. Mellkunde 27(9), 199 (1935); E. Scheil, Z. Mellkunde 28(11), 240 (1936)) and Schwartz (H. A. Schwartz, Metals and Alloys 5(6), 139 (1934)) is slightly modified to take the section thickness (t) into account. The measured area of each rubber particle ($a_i$) is used to calculate the equivalent circle diameter $n_i$: this is the diameter of a circle having the same area as the rubber particle. The distribution of $n_i$ is divided into discrete size groups of 0.05 micometer $d_i$ from 0 to 1 micometer.

$$N_i = \frac{n_i + \sum_{j=i+1}^{m} N_j \sqrt{d_j^2 - d_i^2} - \sqrt{d_j^2 - d_{i-1}^2}}{t + \sqrt{d_i^2 - d_{i-1}^2}}$$

where $N_i$: number of particles in class i after correction $d_i$: maximum diameter of class i m: total number of classes.

$n_i$: number of particles in class i before correction

Once Ni versus $d_i$ is obtained, the volume average diameter (Dv) of the rubber particles is calculated as follows:

$$\text{Volume average diameter } D_v = \sqrt[3]{\frac{\sum_{i=1}^{m} N_i \cdot d_i^3}{N}}$$

"LAR" is the light absorbance ratio determined using a Brinkmann model PC 800 probe calorimeter equipped with a 450 nm wavelength filter, from Brinkmann Instruments Inc., Westbury, N.Y., or equivalent, is used. In a first vial, a 0.4 gram (g) sample of rubber-modified copolymer is dissolved in 40 milliliters (ml) of dimethylformamide (DMF). From the first vial, 5 ml of the resulting DMF solution is added to a second vial containing 40 ml of DMF. From the first vial, 5 ml of the resulting DMF solution is added to a third vial containing 20 ml of dichloromethane (DCM). The probe is zeroed in neat DMF. The absorption of the DMF solution in the second vial and the absorption of the DCM solution in the third vial are determined. The light absorbance ratio is calculated by the following equation:

$$LAR = \frac{(\text{Absorbance of Sample in } DMF)}{(\text{Absorbance of Sample in } DCM)};$$

The following tests were run on Examples 1 to 9 and comparative examples A to E and the results of these tests are shown in Tables 1:

"intrinsic Gloss" was determined by 60° Gardner gloss on specimens prepared from molded samples, 30 minutes after molding, according to ISO 2813 with "Dr. Lange RB3" reflectometer.

Intrinsic gloss specimens were molded on an Arburg 170 CMD Allrounder injection molding machine, having the following molding conditions: Barrel temperature settings of 210, 215, and 220° C.; Nozzle temperature of 225° C., Mold temperature of 30° C.; Injection pressure: 1500 bar; Holding pressure 50 bar; Holding time 6 seconds; Cavity switch pressure: 200 bar; Cooling time: 30 seconds; and injection speed: 10 cubic centimeters per second (cm$^3$/s).

The dimensions of the molded plaque are 64.2 mm×30.3 mm×2.6 mm. Intrinsic gloss is measured in the center of the plaque on the surface at which the pressure is measured. The materials are injected through one injected point located in the middle of the short side of the mold. During injection molding, the injection pressure switches to holding pressure when the cavity pressure reaches the pre-set value. The pressure transducer is located at a distance of 19.2 mm from the injection point. By using a constant pre-set cavity pressure value, the weight of the molded plaques is the same for materials with different flow characteristics.

The polishing of the mold is according to SPI-SPE1 standard of the Society of Plastic Engineers.

"Charpy" impact resistance was determined according to DIN 53453 at 23° C.;

"Izod" impact resistance as measured by the Notched Izod test (Izod) was determined according to ISO 180/4A at 23° C.;

"MFR" melt flow rate was determined according to ISO 1133 on a Zwick 4105 01/03 plastometer at 220° C. and an applied load of 10 kg, samples were conditioned at 80° C. for 2 hours before testing; and "Tensile" property testing was done in accordance with ISO 527-2. Tensile Type 1 test specimens were conditioned at 23° C. and 50 percent relative humidity 24 hours prior to testing. Testing was performed at room temperature using an Zwick 1455 mechanical tester.

TABLE 1

| | Example | | | | | | | | |
|---|---|---|---|---|---|---|---|---|---|
| | 1 | 2 | 3 | 4 | 5 | 6 | 7 | 8 | 9 |
| COMPOSITION | | | | | | | | | |
| Rubber, % | 16.9 | 16.6 | 15.3 | 15.5 | 14.4 | 12.8 | 14.8 | 15.1 | 14.8 |
| % Linear rubber-1 | 78 | 67 | 60 | 50 | 33 | 20 | 22 | | 75 |
| % Linear rubber-2 | | | | | | | | 75 | |
| % Star-branched rubber-1 | 22 | 33 | 40 | 50 | 67 | 80 | | 25 | |
| % Star-branched rubber-2 | | | | | | | 78 | | 25 |
| PBD, % | 13.3 | 13.3 | 12.5 | 13.3 | 13.0 | 12.0 | 13.3 | 13.5 | 13.2 |
| SAN | | | | | | | | | |
| Mw | 170 | 166 | 165 | 179 | 166 | 168 | 143 | 175 | 157 |
| Mn | 52 | 52 | 53 | 56 | 51 | 55 | 46 | 46 | 47 |
| % AN | 22.9 | 23.4 | 23.6 | 23.7 | 22.3 | 22.6 | 22.6 | 23.1 | 22.3 |
| PDMS, % | 0.15 | 0.15 | 0.15 | 0.15 | 0.15 | 0.15 | 0.15 | 0.15 | 0.15 |
| CHARACTERISTICS | | | | | | | | | |
| RPS, micrometer | 0.38 | 0.39 | | 0.33 | | | | | |
| LAR | 1.76 | 1.7 | | 1.71 | | | 1.48 | 1.59 | 1.54 |
| PHYSICAL PROPERTIES | | | | | | | | | |
| Intrinsic Gloss | 71 | 71 | 70 | 76 | 74 | 76 | 80 | 78 | 79 |
| Charpy, kJ/m$^2$ | 13.3 | 14.6 | 13.4 | 11.6 | 13.6 | 12.5 | 9.9 | 12.8 | 13.3 |
| Notch Izod, J/m | 199 | 221 | 185 | 162 | 206 | 180 | 150 | 196 | 164 |
| MFR (220° C./10 kg), g/10 min. | 11 | 11.7 | 13.4 | 10.9 | 14.8 | 12.0 | 16.9 | 11.9 | 14.2 |
| Tensile | | | | | | | | | |
| Yield, MPa | 46 | 45 | 46 | 47 | 45 | 48 | 49 | 47 | 48 |
| Elongation, % | 24 | 33 | 27 | 36 | 45 | 35 | 14 | 19 | 19 |

TABLE 1-continued

| | | Example | | | | |
|---|---|---|---|---|---|---|
| | | A | B | C | D | E |
| COMPOSITION | | | | | | |
| Rubber, % | | 14.5 | 15.2 | 18.5 | 17.5 | 15.4 |
| % Linear rubber-1 | | | 100 | | 85 | 75 |
| % Linear rubber-2 | | | | | | |
| % Star-branched rubber-1 | | 100 | | | | 25 |
| % Star-branched rubber-2 | | | | 100 | 15 | |
| PBD, % | | 14.5 | 10.6 | 17.6 | 12.8 | 11.8 |
| SAN | | | | | | |
| Mw | | | | | 179 | 160 |
| Mn | | | | | 55 | 47 |
| % AN | | | | | | |
| PDMS, % | | | | | | |
| CHARACTERISTICS | | | | | | |
| RPS, micrometer | | 0.42 | 0.36 | 0.58 | 0.35 | 0.35 |
| LAR | | 1.62 | 1.87 | 1.52 | 1.95 | 2.22 |
| PHYSICAL PROPERTIES | | | | | | |
| Intrinsic Gloss | | | 61 | 38 | 55 | 60 |
| Charpy, kJ/m$^2$ | | 7.0 | 5.0 | 17.5 | | |
| Notch Izod, J/m | | | | | | |
| MFR (220° C./10 kg), g/10 min. | | 8.6 | 12.7 | 7.9 | | |
| Tensile | | | | | | |
| Yield, MPa | | 52 | 56 | 39 | | |
| Elongation, % | | | | | | |

What is claimed is:

1. A mass polymerized rubber-modified polymeric composition comprising:
   (i) a continuous matrix phase comprising a copolymer of a monovinylidene aromatic monomer and an ethylenically unsaturated nitrile monomer, wherein said ethylenically unsaturated nitrile is present in an amount greater than 10 percent by weight of the weight of the matrix copolymer and
   (ii) a rubber in the form of discrete particles dispersed in said matrix, said rubber having an average particle size from about 0.15 to 0.39 micrometers and a light absorbance ratio from about 1 to about 5, wherein said rubber consists essentially of
      (a) a star-branched rubber having three or more arms, said arms are one or more 1,3-diene homopolymer and
      (b) a linear rubber,
   said composition having an intrinsic gloss of at least 70 percent as determined by 60° Gardner gloss according to ISO 2813 and an Izod impact strength of at least 150 J/m as determined by ISO 180/4A.

2. The mass polymerized rubber-modified monovinylidene aromatic copolymer composition of claim 1 wherein the ethylenically unsaturated nitrile is in an amount up to about 35 weight percent of the copolymer.

3. The mass polymerized rubber-modified monovinylidene aromatic copolymer composition of claim 1 wherein the monovinylidene aromatic monomer is styrene and the ethylenically unsaturated nitrile monomer is acrylonitrile.

4. The mass polymerized rubber-modified monovinylidene aromatic copolymer composition of claim 1 wherein the matrix copolymer further comprises the monomers butyl acrylate, N-phenyl maleimide or combinations thereof.

5. The mass polymerized rubber-modified monovinylidene aromatic copolymer composition of claim 1 comprising:
   (i) from about 60 to 95 weight percent copolymer and
   (ii) from about 40 to 5 weight percent rubber, weight percents are based on the total weight of the rubber-modified copolymer.

6. The mass polymerized rubber-modified monovinylidene aromatic copolymer composition of claim 1 wherein the linear rubber is a tapered block copolymer of styrene and 1,3-butadiene, a block copolymer of styrene and 1,3-butadiene, a homopolymer of 1,3-butadiene or combinations thereof.

7. The mass polymerized rubber-modified monovinylidene aromatic copolymer composition of claim 1 wherein the linear rubber is a block copolymer of styrene and 1,3-butadiene.

8. The mass polymerized rubber-modified monovinylidene aromatic copolymer composition of claim 1 wherein the rubber particles have a particle size from about 0.15 to about 0.4 micometers.

9. The mass polymerized rubber-modified monovinylidene aromatic copolymer composition of claim 1 having a light absorbance ratio from about 1.0 to about 1.8.

10. The composition of claim 1 further comprising a low molecular weight additive having a surface tension of less than 30 dyne/cm according to ASTM D1331 at 25° C.

11. The composition of claim 10 wherein the low molecular weight additive comprises polydimethylsiloxane.

12. The composition of claim 10 wherein the low molecular weight additive comprises a fluorinated polymer.

13. The mass polymerized rubber-modified monovinylidene aromatic copolymer composition of claim 1 having a melt flow rate of about 1 to 50 gram per 10 minutes at conditions of 220° C. and an applied load of 10 kg.

14. A method for preparing a mass polymerized rubber-modified monovinylidene aromatic copolymer composition comprising the steps of:

(i) polymerizing by bulk, mass-solution or mass-suspension polymerization techniques in the presence of a dissolved rubber a monovinylidene aromatic monomer and an ethylenically unsaturated nitrile monomer, optionally in the presence of an inert solvent, to the desired degree of conversion and (ii) subjecting the resultant mixture to conditions sufficient to remove any unreacted monomers and to cross-link the rubber, wherein the ethylenically unsaturated nitrile is present in an amount greater than 10 percent by weight of the weight of the monovinylidene aromatic copolymer, said rubber has an average particle size from about 0.15 to 0.39 micrometers and a light absorbance ratio from about 1 to about 5, wherein said rubber consists essentially of (a) a star-branched rubber having three or more arms, said arms are one or more 1,3-diene homopolymer and (b) a linear rubber, said composition has an intrinsic gloss of at least 70 percent as determined by 60° Gardner gloss according to ISO 2813 and an Izod impact strength of at least 150 J/m as determined by ISO 180/4A.

15. The method of claim 14 wherein the monovinylidene aromatic monomer is styrene, the ethylenically unsaturated nitrile monomer is acrylonitrile, the rubber comprises (a) a star-branched rubber having about four arms comprising a 1,3-butadiene homopolymer and (b) a linear rubber comprising a styrene and 1,3-butadiene block copolymer.

16. A method for producing a molded or extruded article of a mass polymerized rubber-modified monovinylidene aromatic copolymer composition comprising the steps of:

(A) preparing a mass polymerized rubber-modified monovinylidene aromatic copolymer composition comprising (i) a continuous matrix phase comprising a copolymer of a monovinylidene aromatic monomer and an ethylenically unsaturated nitrile monomer, wherein said ethylenically unsaturated nitrile is present in an amount greater than 10 percent by weight of the weight of the matrix copolymer and (ii) a rubber dispersed as discrete rubber particles in the matrix, said rubber having an average particle size from about 0.15 to 0.39 micrometers and a light absorbance ratio from about 1 to about 5, wherein said rubber consists essentially of (a) a star-branched rubber having three or more arms, said arms are one or more 1,3-diene homopolymer and (b) a linear rubber, and (B) molding or extruding said rubber-modified monovinylidene aromatic copolymer composition into a molded or extruded article having an intrinsic gloss of at least 70 percent as determined by 60° Gardner gloss according to ISO 2813 and an Izod impact strength of at least 150 J/m as determined by ISO 180/4A.

17. The method of claim 16 wherein the molded or extruded article is selected from the group consisting of household appliances, toys, automotive parts, extruded pipe, profiles and sheet for sanitary applications, power tool housings, telephone housings, computer housings and copier housings.

18. The composition of claim 1 in the form of a molded or extruded article.

19. The molded or extruded article of claim 18 is selected from the group consisting of household appliances, toys, automotive parts, extruded pipe, profiles and sheet for sanitary applications, power tool housings, telephone housings, computer housings and copier housings.

* * * * *

UNITED STATES PATENT AND TRADEMARK OFFICE
CERTIFICATE OF CORRECTION

PATENT NO. : 6,380,304 B1
DATED : April 30, 2002
INVENTOR(S) : Rony S. Vanspeybroeck et al.

It is certified that error appears in the above-identified patent and that said Letters Patent is hereby corrected as shown below:

<u>Column 18,</u>
Line 48, delete claim 8

Signed and Sealed this

Twenty-first Day of October, 2003

JAMES E. ROGAN
*Director of the United States Patent and Trademark Office*